Dec. 13, 1966   M. J. DE GOOD ETAL   3,291,279
DIVERTING CONVEYOR

Filed July 26, 1965   3 Sheets-Sheet 1

INVENTORS
MAYNARD J. DE GOOD
CLYDE L. BOWMAN
BY
Price & Heneveld
ATTORNEYS

INVENTORS
MAYNARD J. DE GOOD
CLYDE L. BOWMAN
BY
*Price & Heneveld*
ATTORNEYS

United States Patent Office 3,291,279
Patented Dec. 13, 1966

3,291,279
DIVERTING CONVEYOR
Maynard J. De Good and Clyde L. Bowman, Grand Rapids, Mich., assignors to The Rapids-Standard Company, Inc., Grand Rapids, Mich., a corporation of Michigan
Filed July 26, 1965, Ser. No. 474,570
7 Claims. (Cl. 198—20)

This application is a continuation-in-part application of co-pending U.S. application, Serial No. 418,477, filed December 15, 1964 entitled High Speed Take-Off, and assigned to the assignee herein. The apparatus disclosed and claimed herein is an improvement of that disclosed and claimed in such co-pending application.

This invention relates to conveyors, and more particularly to article diverter and transfer mechanism for shifting articles laterally from a conveyor surface to an article receiving surface such as a second conveyor surface.

In laterally diverting an article from a conveyor path, speed of the diverted article in the diverting direction is important to prevent pile up of following articles on the diverted article. The apparatus described in the above identified patent application, utilizing recirculating wheels rolling along an elongated track achieves high speed take-off. However, diversion of articles such as cartons, particularly long ones, requires a change both in direction and in article orientation. This is frequently necessary in order to maintain complete routing control over the articles.

It is an object of this invention to provide a high speed article transfer or diverting system for conveyors causing a change in angular orientation in the article to match the change of direction of the article.

Another object of this invention is to provide a high speed conveyor diverting apparatus that rotates an article being diverted through a controlled angle, and yet prevents piling up of subsequent articles on the rotating diverted article by a special accelerating action of the article in the diverting direction from the original conveyor path. The diversion is smooth, rapid and complete. The system is sensitive to rapidly divert only predetermined articles without interfering with adjacent articles. Its actuation is rapid and immediate, but controllably temporary so as to be highly selective.

These and several other objects of this invention will become apparent upon studying the following specification in conjuntcion with the drawings in which:

FIG. 7 is an enlarged, side elevational view of one of the rolling wheels forming a component of these devices.

Figure 1:
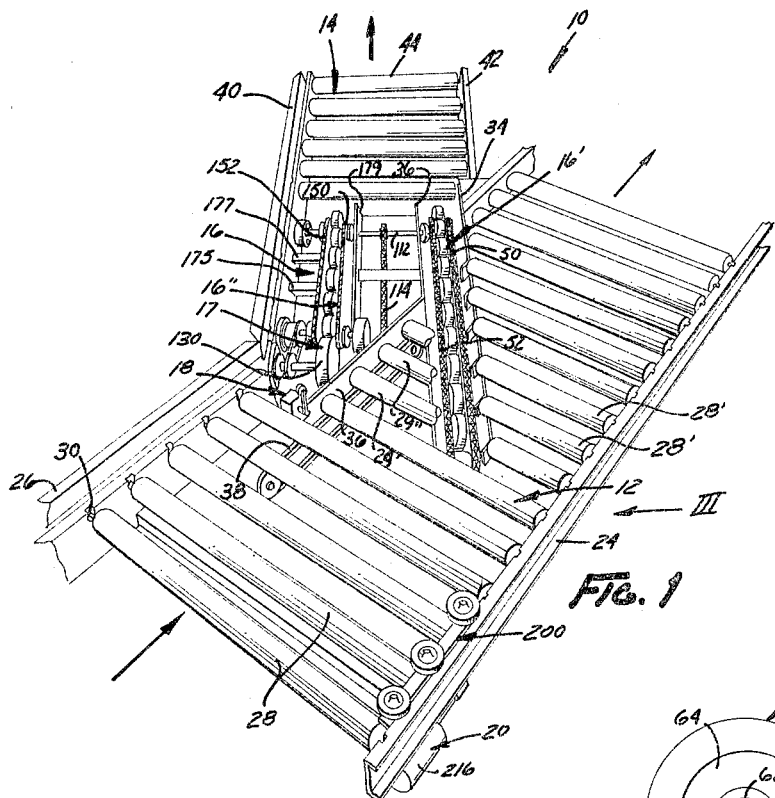
FIG. 1 is a perspective view of the top portion of the conveyor system embodying the novel take-off assembly.

Referring now specifically to the drawings, the complete conveyor system 10 comprises a first conveyor assembly 12 forming a first main conveyor surface, a second conveyor assembly 14 forming a second conveyor surface at an obtuse angle with respect to the first surface, article turning means 17 and article diverting assembly 16 intersecting both conveyor surfaces, activating means 18 for the diverting assembly, and optional article movement control means 20 for controllably positioning selected articles in operative relationship to the turning means 17 and the diverter activating means 18.

The main conveyor subassembly 12 basically is formed with a pair of parallel, spaced side rails 24 and 26 receiving therebetween a plurality of transverse, rotatable elements such as cylindrical rollers 28. These may be suspended on the side rails by having their end axles positioned in notch 30 in the side rails, in conventional fashion.

A segment of side rail 26 is removed to join with the branch conveyor and to receive diverting subassembly 16. Adjacent the diverting subassembly, conveyor 12 has a plurality of shorter cylindrical roller elements. A first series of these, 28′, 28″, etc. of increasing length, are suspended between side rail 24 and a diagonal metal plate 34 positioned below the conveying surface of conveyor assembly 12, and anchored to its structure. A second plurality of cooperative but shorter rolls 29′, 29″, etc. extend between a first elongated support plate 36 which is parallel to and spaced from plate 34, diagonal to the direction of movement on the main conveyor, and a second support plate 36 parallel to side rail 26, but spaced inwardly thereof toward side rail 24.

Conveyor 12 may be a live roller conveyor, powered for example by an underlying moving belt (not shown). In such an instance, the shortened rolls 29′, 29″, etc. are powered by an auxiliary underlying idler belt 38 which also contacts the normal driven rolls 28.

The article diverting mechanism overlaps this main conveyor 12 at an obtuse angle with respect to the normal direction of movement. It is at the same angle as the branch conveyor 14. It also overlaps the article receiving surface, such surface normally being that of a second conveyor 14, but alternatively being a work surface, a storage area, or any other suitable receiving surface. The branch conveyor shown includes a pair of side rails 40 and 42 having rotatable cylindrical rollers 44 mounted therebetween in normal fashion.

Figure 5:
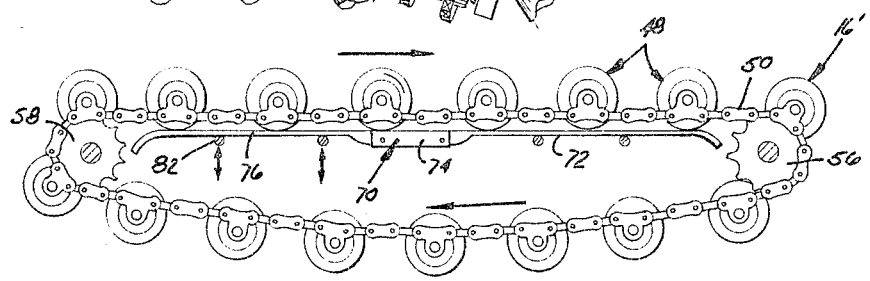
FIG. 5 is a side elevational view of the shiftable one of the two chain-roller-chain-track devices shown in FIG. 1.

The diverting assembly 16 comprises a first chain driven, roller-on-track assembly 16′, and a second chain driven roller-on-track assembly 16″ spaced from, parallel to and cooperative with roller-on-track assembly 16′. Assembly 16′ includes a plurality of roller wheels 48 (FIG. 5), each wheel suspended between special links of a pair of spaced, endless, recirculatory roller chains 50 and 52. These each travel endlessly around a pair of aligned sprockets on opposite ends of the chain. These are illustrated by the representative sprockets 56 and 58 for chain 50. Each chain is provided with the special links 60 (FIG. 7) having an upstanding support portion 60′ to receive the axle pin 62 for the hub 64 of the wheel 48.

Underlying the upper pass portion of the continuously recirculatory chain and wheel mechanism of assembly 16′ is a first flat track 70. It includes a fixed downstream track portion 72, an interconnecting center line 74 pivotally connected on one end to the upstream end of downstream track portion 72, and an upstream portion 76 pivotally connected on its downstream end to link 74. Track portion 76 is vertically shiftable, and overlaps conveyor 12. It is normally retained in a lowered position where the upper surfaces of its operating rollers 48 are below the upper surfaces of rollers 28 and 28′, etc. forming the conveying surface of conveyor 12.

This upstream track portion 76 can be elevated by a pair of spaced toggle linkages 81 and 83 (FIG. 4) to elevate the upper surfaces of rollers 48 above the conveyor surface formed by rollers 28, 28', etc. These toggle linkages are actuated by torsion rods 92 and 93. The linkages hoist rods 80 and 82 beneath track section 76 to elevate it. One of the toggle linkages is described in detail for illustration. Preferably, a double toggle linkage is employed to do this. Rod 80 is mounted between a pair of cooperative links 86 and 86' which are also pivotally mounted on their lower ends to another lower pin 88. This pin is pivotally mounted to the upper end of a second cooperative pair of links 90 and 90' mounted on their lower ends to a shaft 92 to rotate therewith.

This shaft 92 extends laterally through support plate 34 where a crank 94 is affixed thereto. The crank is connected to a rod 96 that is pivotally mounted through a clevis 98 to the reciprocable shaft 100 of a fluid cylinder 102. This fluid cylinder is also mounted to the conveyor as by being secured to the support plate 34. The second toggle linkage 83 is basically the same type of linkage as linkage 81.

Figure 4:
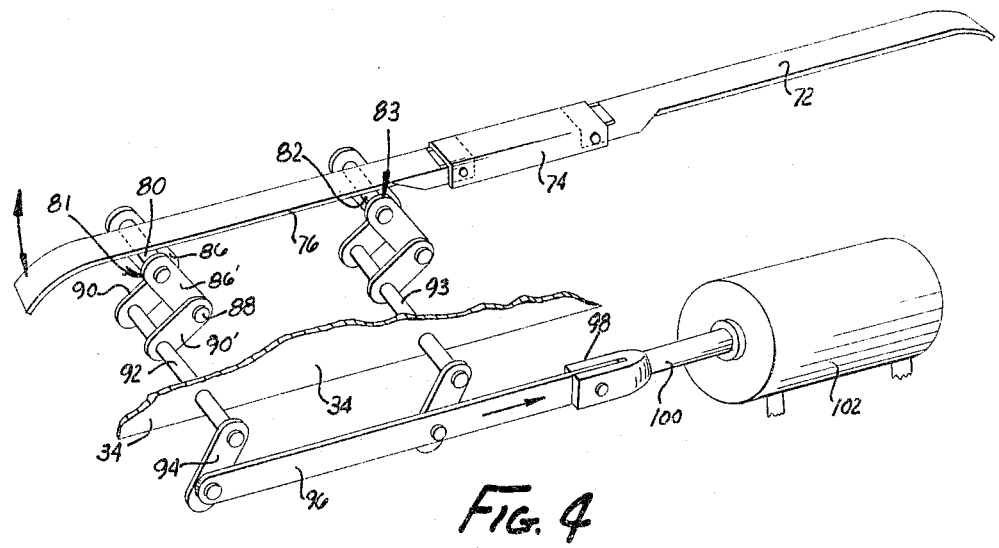
FIG. 4 is a fragmentary, enlarged, perspective view of a portion of the wheel elevating apparatus in the assembly of FIG. 1.

Retraction of rod 100 into fluid cylinder 102 in the direction indicated by the arrow in FIG. 4 shifts the cranks to rotate the two rods 92 and 93, thereby extending toggle link sets 81 and 83 to an extended position elevating track portion 76 a fraction of an inch. This elevates recirculatory roller wheels 48 as they pass over this track portion. Since the roller wheels travel in the diverting direction along the branch conveyor, they can intercept a package to divert it onto the receiving surface of conveyor 14. This action occurs in a cooperative manner with the second roller and track subassembly 16" in a manner to be described.

The second roller and track subassembly 16" is slightly upstream of subassembly 16' with respect to the direction of main conveyor movement. It does not significantly intersect the main conveyor surface. It can be permanently affixed in an elevated position where the surface of its rollers 148 are about at the height of rollers 48 when elevated, i.e. above the main conveyor surface.

Figure 6:
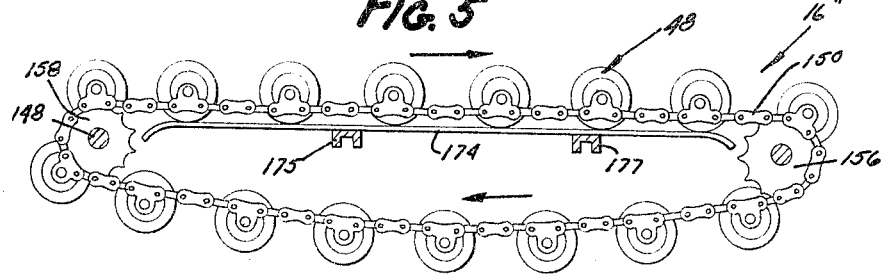
FIG. 6 is a side elevational view of the second chain-roller-track device in FIG. 1.

Rollers 148 are likewise mounted between a pair of chains 150 and 152 which recirculate around respective sprockets on opposite ends of the device, illustrated by representative sprockets 156 and 158 for chain 150 (FIG. 6). The track 174 for this subassembly can be permanently affixed on a pair of transverse supports 175 and 177 which extend between elongated support plate 179 (FIG. 1) and side rail 40.

Figure 2:
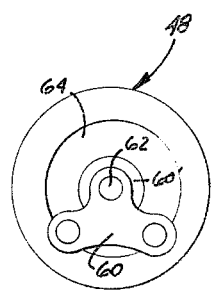
FIG. 2 is an enlarged, fragmentary, perspective view of the take-off assembly shown as part of the conveyor apparatus in FIG. 1.

Both of these roller-track-chain subassemblies 16' and 16" are continuously recirculated by having their downstream sprockets mounted on a drive shaft 112 driven by chain 114 (FIGS. 1 and 2). This chain is driven around its sprockets 116 and 118 by an electrical motor 120. These chains and supported rollers continually recirculate through their upper and lower passes whether the overlapping portion of subassembly 16' is elevated or lowered.

Cooperatively associated with this diverting mechanism 16, and particularly with mechanism 16', is a speed control subassembly 17. This subassembly includes an enlarged diameter rotational wheel 130 mounted on an axle 132 between a pair of bearing journals 134 and 136. These journals are secured to side rail 40 and support plate 179, respectively. Shaft 132 is rotationally driven by a chain 138 from a sprocket 139 that passes around the same shaft 141 that supports the recirculatory chain sprockets. Hence, this wheel also constantly rotates. The wheel is within the confines of the main conveyor 12, and its upper surface projects slightly above the surface of rollers 28 of the main conveyor.

This wheel 130 has a peripheral surface speed purposely slower than the over-all surface speed of rollers 48 of subassemblies 16' and 16". This is readily achieved, even though wheel 130 is of substantially larger diameter than rollers 48, since the surface speed of rollers 48 equals the sum of their own peripheral speed, plus the rate at which these rollers 48 move across the platform track.

Because of this speed differential, a carton moving along conveyor surface 12, if it contacts both elevated rollers 48 of subassembly 16' on its one side, and contacts the slower rotating wheel 130 on its other side, will be turned through an angle as it is diverted. By controlling the rate of differential between these speeds, the carton can be turned a selected amount, usually just sufficient to achieve the proper new alignment. As soon as the carton is rotated the selected amount, it then is in an advanced position past wheel 130, and is picked up by both subassemblies 16' and 16". Since these operate at the same speed, the carton is advanced further down the track. Its diversion will be rapid as long as it is in engagement with the high speed wheels 48 and 148.

This combination sumultaneously effectuates article reorientation and article diversion onto the supporting surface. By simply controlling the rate of speed of the peripheral speeds of the respective roller elements, i.e. the pivot roller 130 and the diverting rolls 48. A particular angle of take-off can be selected to suit the circumstances of the facility involved. Since it is quite important that wheel 130 contact the article almost immediately upon the engagement with elevated diverting means 16', wheel 130 should also be within the confines of the main conveyor surfaces. It is along one edge of the conveyor. In order to operate on a carton or other article, the wheel must be brought into operative engagement with the carton, as by shifting one or the other. The wheel can be placed in action by elevating it simultaneously with elevation of part of means 16'. Alternatively, as is shown in the illustrative form depicted, wheel 130 can remain elevated above the conveyor surface, with engagement of the carton being achieved by shifting the carton laterally on the conveyor to the wheel. This is done by controlling the lateral position of each carton on the conveyor.

Figure 8:
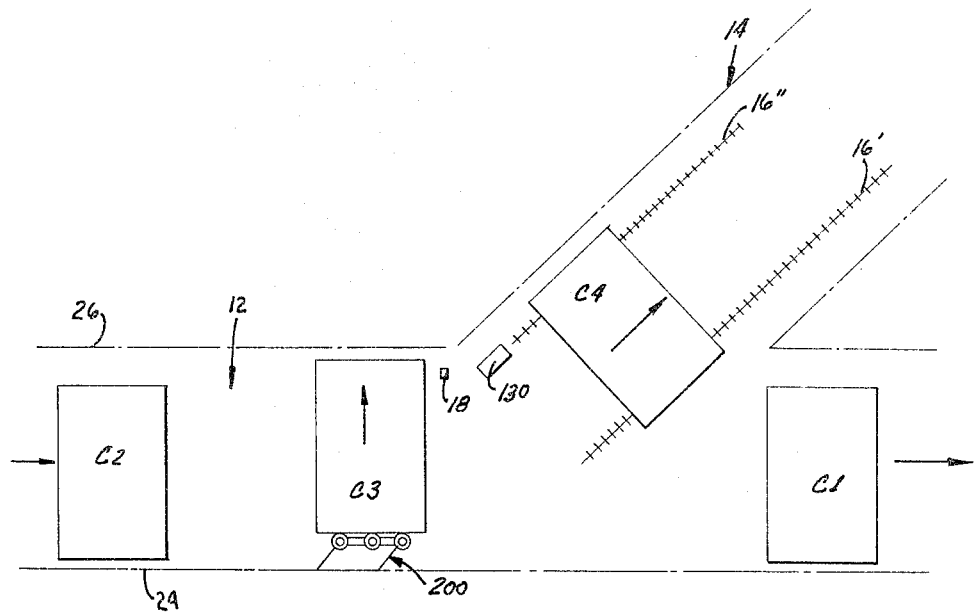
FIG. 8 is a schematic diagram showing the selective diversion of specific articles of a plurality of articles flowing along the conveyor system.

Normally, if the overlapping subassembly 16' is in its lowered position, a carton passing down this main conveyor 12 will simply pass by the diverting mechanism and continue in its normal direction of movement as indicated by the carton C1 in FIG. 8. The cartons miss pivot wheel 130 because they are closer to side rail 24 than to side rail 26 as illustrated by the carton C2 in FIG. 8. Such a carton will therefore move past pivot wheel 130 even though the pivot wheel overlaps the main conveyor surface and projects above it. To divert a carton, it must be shifted laterally so one side of its bottom coincides with pivot wheel 130. To divert the carton, and help rotate it, the intersecting upstream portion of the recirculatory chain roller and track subassembly 16' must also be in an elevated position. This elevation can be activated by having the carton strike a limit switch 18 which actuates a suitable pneumatic or hydraulic solenoid operated valve 103 (FIG. 2) to operate cylinder 102 (FIGS. 2 and 4).

Figure 3:
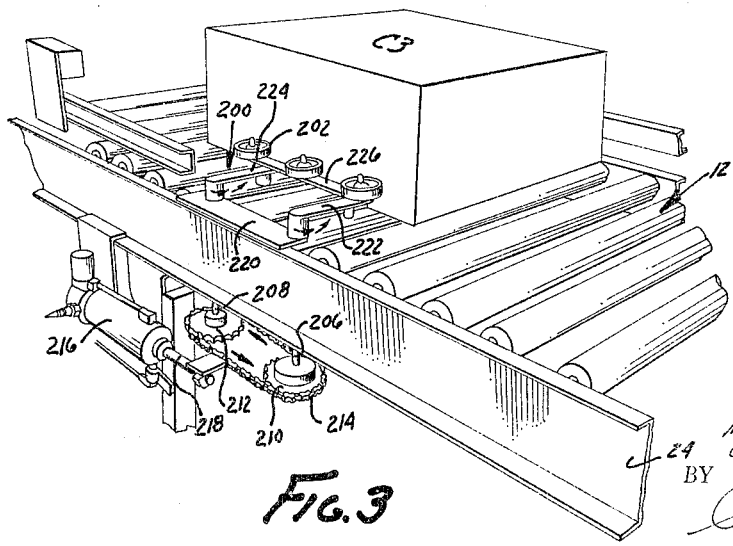
FIG. 3 is a perspective view showing the operation of a portion of the apparatus in FIG. 1, and taken from the direction generally indicated by the arrow designated III in FIG. 1.
Figure 2:
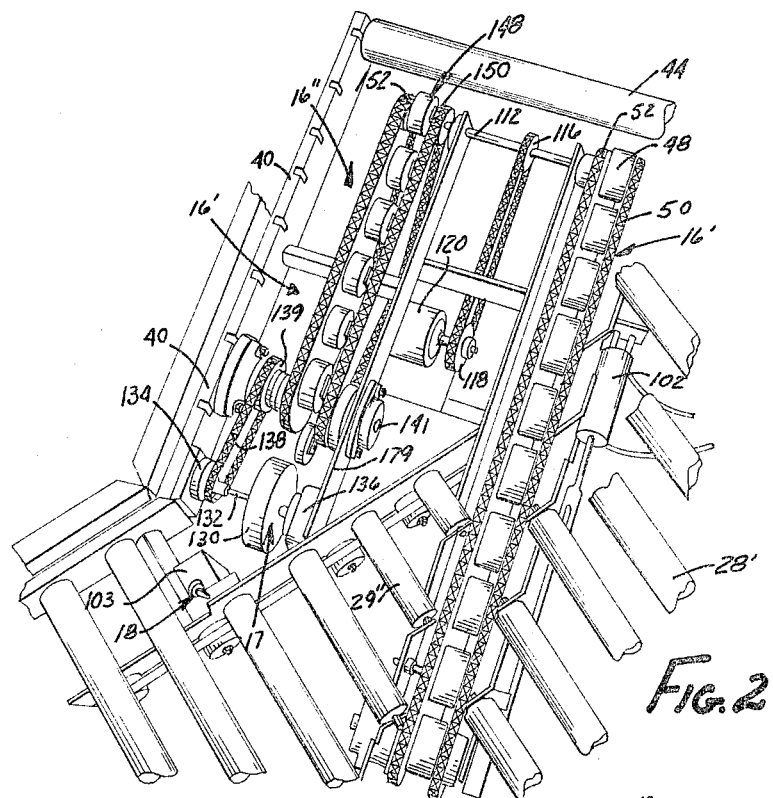

The carton can be shifted from one side of the conveyor toward the diverter structure by any suitable means, such as the linkage 200 (FIG. 3) formed of parallel legs 220 and 226, and parallel legs 222 and 224, pivotally interconnected. Leg 226 has pushing rollers 202 thereon to laterally shove a carton such as carton C3 (FIGS. 3 and 8) to a position where it will intersect limit switch 18 and also pivot wheel 130. The parallelogram linkage can be shifted from the retracted position shown in FIG. 1 to the extended position shown in FIGS. 3 and 8, by rotating two vertical shafts 206 and 208 which extend up along side rail 24 and are affixed to one end of parallelogram links 222 and 224. These shafts can be rotated by rotating the sprockets 210 and 212 on their lower ends with a chain 214 shifted by a fluid cylinder 216. The cylinder is operated in accordance with a suitable signal. Any suitable signal mechanism (not shown) may be employed for actuating cylinder 216. Or, it may be manually shifted. Shifting of the cylinder to extend its rod 218 shifts chain 214 to rotate the sprockets and shafts, thereby extending the parallelogram linkage to shove carton C3 across the conveyor.

In operation, therefore, when a carton such as C2 is loaded on the conveyor, it is loaded toward side rail 24 (in this illustrative form of the device). If it is to be diverted, a suitable signal is given to cause the pneumatic cylinder 216 to extend parallelogram linkage 200 to push the carton transversely across the conveyor toward side rail 26. It then contacts limit switch 18 which, through solenoid valve 103, causes fluid to actuate cylinder 102 (FIGS. 2 and 4). This cylinder then retracts its rod 100 to shift both toggle linkage sets 81 and 83 to an extended position to elevate platform portion 76. This track portion then elevates the constantly recirculating wheels 48 as they pass over it, to a position above the surface of rollers 28, 28', etc. The bottom of a carton will then contact pivot wheel 130 on one side and rollers 48 on the other side. Since wheel 130 is rotated at a slower peripheral speed than the speed of rollers 48, the carton portion above rollers 48 will be advanced at a greater speed than the portion above pivot wheel 130 to rotate the carton through a small angle. The moving carton (e.g. C4), by the time it passes over pivot wheel 130, is re-oriented so that, as it is further accelerated to the diverting surface by subassemblies 16' and 16", it is re-oriented to its new direction of travel. Upon passage of the carton, the limit switch will be de-activated to shift fluid cylinder 102 in the opposite direction, thereby lowering the track section that intersects the main conveyor surface. The diversion and re-orientation occur so rapidly that even closely following cartons are not interfered with. It will be realized that the take-off speed of the carton is very substantial, with the carton being substantially accelerated during take-off.

It is conceivable that the concept presented herein may be embodied in several modified forms of the specific structure illustrated. Those familiar with conveyor technology will realize that the particular form of the conveyor can vary widely to suit particular surroundings, purposes, type of articles, rolling elements, and so forth. It is also realized that different types of activating means for the diverting mechanism may be employed without departing from the broader aspects of the concept presented herein. Therefore, the invention is intended to be limited only by the scope of the appended claims, and the reasonably equivalent structures to those defined therein.

We claim:

1. Conveyor apparatus comprising: means forming an article conveyor surface and means forming an article receiving surface at an angular intersection to said conveyor surface, along one side thereof; article diverting means from said conveyor surface to said receiving surface, including article propelling means overlapping said surfaces at an angle to said conveyor surface and projectable above said conveyor surface to engage the bottom of an article thereon; rotatably driven article pivot means at said intersection at said one side of said conveyor surface, spaced from said propelling means with respect to said conveyor surface; and power drive means operably associated with said pivot means and said propelling means to drive said rotating pivot means at a slower advancing speed than that of said propelling means, causing said propelling means to turn an article through an angle about said pivot means as the article is diverted.

2. Conveyor apparatus comprising: means forming an article conveyor surface, and means forming an article receiving surface at an angular intersection to said conveyor surface, along one side thereof; article transfer means from said conveyor surface to said receiving surface, including recirculatory article propelling means overlapping said surfaces at an angle to said conveyor surface and including a plurality of rotatable recirculating rollers projectable above said conveyor surface to engage the bottom of an article thereon; a rotatably driven wheel forming an article pivot means at said intersection at said one side of said conveyor surface spaced from said propelling means with respect to said conveyor surface; power drive means operably associated with said wheel and said propelling means to drive the article engaging surface of said wheel at a slower speed than the article engaging surface of said rollers of said propelling means, causing said propelling means to turn an article through an angle about said pivot means as it is advanced at differential rates by said wheel and rollers.

3. Conveyor apparatus comprising: means forming an article conveyor surface and means forming an article receiving surface at an angular intersection to said conveyor surface, along one side thereof; article transfer means from said conveyor surface to said receiving surface including article propelling means overlapping said surfaces at an angle to said conveyor surface; a rotatably driven wheel forming an article pivot means at said intersection at said one side of said conveyor surface, spaced from said propelling means; power drive means operably associated with said wheel and said propelling means to drive the article engaging surface of said wheel at a slower speed than the article engaging surface of said propelling means, causing said propelling means to turn an article about said pivot means as it is diverted; and second article propelling means in said receiving surface, behind said wheel, and parallel to said first article propelling means to cooperatively advance along said receiving surface a turned, transferred article with said first mentioned article propelling means.

4. Conveyor apparatus comprising: means forming an article conveyor surface and means forming an article receiving surface at an angular intersection to said conveyor surface, along one side thereof; article transfer means from said conveyor surface to said receiving surface including article propelling means overlapping said surfaces at an angle to said conveyor surface, and including a pair of elongated spaced parallel mounting supports extending into said conveyor surface; two pairs of spaced sprockets mounted in alignment at opposite ends of said supports, one pair beneath said conveyor surface and the second pair beneath said receiving surface; a pair of flexible endless drive chains on said sprockets, oriented along said receiving surface while mounted in a circuitous path with a forward pass portion adjacent said first and second surfaces and a return portion therebeneath; an elongated support track extending between said chains, below said first and second surfaces; a plurality of rotatable elements with high friction surfaces, between said chains, rotatably attached thereto, and suspended therefrom; said rotatable elements resting on said track to roll therealong when driven linearly by said chains; powered drive means operably connected to said chains; said track including vertically shiftably mounted portions overlapping said conveyor surface; shiftable elevating and lowering means for said track for shifting said upstream track end to an elevated position elevating said rotatable elements above said conveyor surface for article diverting, and to lowered non-diverting position below said conveyor surface; a rotatably driven pivot wheel upstream of said propelling means with respect to said conveyor surface, and alongside said conveyor surface; and power drive means operably associated with said wheel and said propelling means to drive the article engaging surface of said wheel at a slower speed than the article engaging surface of said propelling means, to turn an article as it is being diverted.

5. Conveyor apparatus comprising: means forming an article conveyor surface and means forming an article receiving surface at an angular intersection to said conveyor surface, along one side thereof; article transfer means from said conveyor surface to said receiving surface including article propelling means overlapping said surfaces at an angle to said conveyor surface, and including a pair of elongated spaced parallel mounting supports extending into said conveyor surface; two pairs of spaced sprockets mounted in alignment at opposite ends of said supports, one pair beneath said conveyor surface and the second pair beneath said receiving surface, a pair of flexible endless drive chains on said sprockets, oriented along said receiving surface while mounted in a circuitous path with a forward pass portion adjacent said first and second surfaces and a return portion therebeneath; an elongated support track extending between said chains, below said first and second surfaces with an upstream end below said first surface and a downstream end below said second surface; a plurality of rotatable elements with high friction surfaces, between said chains, rotatably attached thereto, and suspended therefrom; said rotatable elements resting on said track to roll therealong when driven linearly by said chains; powered drive means operably connected to said chains; said track including vertically shiftably mounted portions overlapping said conveyor surface; shiftable elevating and lowering means for said track for shifting said upstream track end to an elevated position elevating said rotatable elements above said conveyor surface for article diverting, and to lowered non-diverting position below said conveyor surface; a rotatably driven pivot wheel spaced from said propelling means with respect to said conveyor surface, and alongside said conveyor surface; power drive means operably associated with said wheel and said propelling means to drive the article engaging surface of said wheel at a slower speed than the article engaging surface of said propelling means; second article propelling means in said receiving surface, behind said wheel, parallel to said first article propelling means and operably associated with said drive means to be driven at the same speed as said first propelling means, to cooperatively advance a turned, transferred article with said first mentioned article propelling means along said receiving surface; said second propelling means also including a pair of elongated spaced parallel mounting supports, two pairs of spaced sprockets mounted in alignment at opposite ends of said supports, a pair of flexible endless drive chains on said sprockets, oriented along said second surface while mounted in a circuitous path with a forward pass portion and a return portion therebeneath, an elongated support track extending between said chains, and a plurality of article engaging rotatable elements with high friction surfaces between said chains, rotatably attached thereto, and suspended therefrom, said rotatable elements resting on said track to roll therealong when driven linearly by said chains.

6. Conveyor apparatus comprising: means forming an article conveyor surface, and means forming an article receiving surface intersecting with one side of said conveyor surface at an obtuse angle with respect to the downstream path of travel on said conveyor surface; article diverting mechanism from said conveyor surface to said receiving surface including first and second spaced, circulatory, article propelling means oriented along said angle in said receiving surface; said first propelling means projecting up above said receiving surface to help propel one side of an article diverted from said conveyor surface; said second propelling means having a portion overlapping said conveyor surface and vertically shiftable from a lowered non-diverting position to a raised diverting position; diversion control shifting means to raise and lower said downstream propelling means portion for controllably engaging the second side of an article; and article pivot means at said first propelling means, along said one side of said conveyor surface to allow said second propelling means, when raised, to turn an article thereabout for re-orientation of the article onto said receiving surface.

7. Conveyor apparatus comprising: means forming an article conveyor surface, and means forming an article receiving surface with two side edges, at an angular intersection to said conveyor surface, along one side thereof, and having one side edge intersecting said conveyor surface upstream of the other side edge; a pair of first and second spaced driven article diverting means at said intersection, oriented toward said receiving surface, said first diverting means being closer said one side edge, and said second diverting means being closer said second side edge; said first diverting means including a lead-in rotational device and including a follow-up advancing means movable toward said receiving surface; said second diverting means including article advancing means movable toward said receiving surface and including portions projectable above said conveyor surface; and power drive means operably associated with said first and second diverting means to drive said rotational device at one article advancing speed, and both said advancing means at an article advancing speed greater than that of said device and substantially equal to that of each other.

References Cited by the Examiner
UNITED STATES PATENTS 3,018,873    1/1962    Burt _____ 198—38
3,138,238    6/1964    Good _____ 198—127

EVON C. BLUNK, *Primary Examiner.*

EDWARD A. SROKA, *Examiner.*